(12) United States Patent
Savenok et al.

(10) Patent No.: US 11,232,524 B2
(45) Date of Patent: Jan. 25, 2022

(54) SYSTEM FOR ENHANCING DATA TRANSMISSION IN A NETWORK ENVIRONMENT

(71) Applicant: REMOTE MEDIA, LLC, Wheaton, IL (US)

(72) Inventors: Alexander Savenok, Grandview, MO (US); Pavel Savenok, Wheaton, IL (US); Gregory H. Leekley, Charlotte, NC (US)

(73) Assignee: Vertigo Media, Inc., Charlotte, NC (US)

( * ) Notice: Subject to any disclaimer, the term of this patent is extended or adjusted under 35 U.S.C. 154(b) by 198 days.

(21) Appl. No.: 16/094,401

(22) PCT Filed: Apr. 21, 2017

(86) PCT No.: PCT/US2017/028908
§ 371 (c)(1),
(2) Date: Oct. 17, 2018

(87) PCT Pub. No.: WO2017/185014
PCT Pub. Date: Oct. 26, 2017

(65) Prior Publication Data
US 2019/0130497 A1 May 2, 2019

Related U.S. Application Data

(63) Continuation-in-part of application No. 15/407,192, filed as application No. PCT/US2017/028908 on Apr. 21, 2017, now Pat. No. 10,198,777.

(Continued)

(51) Int. Cl.
*G06F 16/00* (2019.01)
*G06Q 50/00* (2012.01)
(Continued)

(52) U.S. Cl.
CPC ........... *G06Q 50/01* (2013.01); *G06F 21/604* (2013.01); *G06Q 20/065* (2013.01);
(Continued)

(58) Field of Classification Search
CPC .... G06Q 50/01; G06Q 20/065; G06Q 50/184; G06F 21/604; H04L 12/1818;
(Continued)

(56) References Cited

U.S. PATENT DOCUMENTS 6,513,050 B1    1/2003   Williams et al.
6,788,333 B1 *   9/2004   Uyttendaele ....... H04N 5/23238
                                                   348/36

(Continued)

*Primary Examiner* — Hung Q Pham
(74) *Attorney, Agent, or Firm* — Christopher J. Scott

(57) ABSTRACT

A data handling or patching system operates to reduce redundant data within a data storage. Data files are compared, and a data difference is output. In files that have very similar data, the data difference between values is relatively small, and thus when a basic data file and a data difference file are stored, data redundancy is significantly reduced. The data difference of "diff" file can then be used to losslessly reproduce the data of either of the compared files. A first or primary port is dedicated for base quality transmissions on which the broadcasting client sends the lowest available quality. Additional or secondary ports enable transmission of higher than base quality data, sent as "diff's" of the base quality. The receiving client combines the "diff" data on the secondary ports with the base data of the first port, to produce higher quality media.

17 Claims, 11 Drawing Sheets

Related U.S. Application Data

(60) Provisional application No. 62/326,428, filed on Apr. 22, 2016.

(51) Int. Cl.

| | | |
|---|---|---|
| *H04L 29/06* | (2006.01) | |
| *G06F 21/60* | (2013.01) | |
| *G06Q 20/06* | (2012.01) | |
| *G06Q 50/18* | (2012.01) | |
| *H04L 29/08* | (2006.01) | |
| *H04L 12/18* | (2006.01) | |
| *H04L 12/58* | (2006.01) | |

(52) U.S. Cl.
CPC ....... *G06Q 50/184* (2013.01); *H04L 12/1818* (2013.01); *H04L 12/1822* (2013.01); *H04L 51/32* (2013.01); *H04L 63/10* (2013.01); *H04L 65/1069* (2013.01); *H04L 65/4076* (2013.01); *H04L 65/4084* (2013.01); *H04L 67/1063* (2013.01); *H04L 67/1074* (2013.01); *H04L 67/1095* (2013.01); *H04L 12/1845* (2013.01)

(58) Field of Classification Search
CPC ..... H04L 12/1822; H04L 51/32; H04L 63/10; H04L 65/1069; H04L 65/4076; H04L 65/4084; H04L 67/1063; H04L 67/1074; H04L 67/1095; H04L 12/1845
See application file for complete search history.

(56) References Cited

U.S. PATENT DOCUMENTS

| | | |
|---|---|---|
| 7,640,363 B2 | 12/2009 | Teodosiu et al. |
| 8,074,241 B2 | 12/2011 | Arfidsson et al. |
| 8,656,020 B1 | 2/2014 | Rademacher et al. |
| 2007/0288533 A1* | 12/2007 | Srivastava ............... G06F 16/27 |
| 2014/0044191 A1 | 2/2014 | Kalevo et al. |
| 2016/0330490 A1* | 11/2016 | Kitahara ............ H04N 21/6125 |

* cited by examiner

SYSTEM FOR ENHANCING DATA TRANSMISSION IN A NETWORK ENVIRONMENT

PRIOR HISTORY

This U.S. patent application claims the benefit of U.S. Provisional Patent Application Ser. No. 62/326,428 filed in the United States Patent and Trademark Office (USPTO) on 22 Apr. 2016, and is a Continuation-in-Part patent application of pending U.S. patent application Ser. No. 15/407,192 filed in the USPTO on 16 Jan. 2017, the specifications of both of which applications are hereby incorporated by reference thereto.

FIELD OF THE INVENTION

The present invention generally relates to mobile application features or software tools interoperable or cooperable by way of networked computers as typified by networked mobile communications devices for implementing the mobile application features or software tools and providing for a reduction in stored data redundancy at server locations within the network, and enhanced data transmissions intermediate sending and receiving clientele. More particularly, the mobile application features or software tools according to the present invention enable users to share and consume in real time user-selected or user-generated content while simultaneously sharing and consuming media content while reducing data redundancy in digital storage and enhancing data transmissions so as to maximize the efficiency of the system and associated methods.

SUMMARY OF THE INVENTION

The systems and methods here presented for consideration comprise several primary areas of concern, including the following general topics: PCM Patching; PCM Storage; Base File Matching; PCM Difference Data Playback; Multi-port Data Delivery; 360 Video Delivery; and Video-Music Synchronization. The PCM patching or handling aspects of the present systems and methods are believed central to the present specifications and primarily operate to reduce redundant PCM data within a storage system focused on storing PCM related content. The PCM patching or handling applications according to these specifications require two comparable media files, which are either stored in raw PCM or in a compressed form that decodes to PCM. If required the files are decompressed and raw PCM data is output.

The output samples for the PCM data are then compared, and the difference between both values is then calculated. In files that have very similar PCM data, the difference between PCM values is relatively slight and is indicative of a highly redundant data comparison. Standard compression techniques can be implemented to reduce the size of the so-called "diff" or data difference file to 60-70% of the original compressed file size. The difference in PCM values is stored in a "diff" file that is then passed through a compression appliance. The "diff" file can then be used to losslessly reproduce the PCM data of either of the first or second compared files from the "diff" of their PCM data.

The PCM storage system according to these specifications operates by mapping base files to PCM file "cliff's" of "diff" files. A "diff" file is the file that stores the difference in PCM data between the base file and the originally uploaded file. On request from a compatible client, the storage system returns the data for both the base file and the "diff" file, which the client then uses to re-produce the PCM data of the original file.

Before the system stores and generates "diff's" off of base files, it first maps them to possible matches using a file (e.g. audio) fingerprinting or file-identifying mechanism. All base files that have similar fingerprints or file-identifiers to the uploaded file are possible base file candidates. To identify the optimal base file, the system (a) generates "diff's" off of all base files, and (b) compares "diff" size(s) to an established threshold value. If all "diff's" exceed the threshold value, the uploaded file becomes a base file. If one or more "diff's" fall below the threshold value, the smallest "diff" file is stored and the original file is deleted. Audio playback for the PCM "diff" system according to the present invention requires the following steps: (a) decoding a base file to PCM data; (b) patching the base file PCM data with data from the "diff" file; and (c) sending the patched PCM data file for audio playback.

The systems and methods according to the present invention further rely on multiple TCP or UDP ports for enhancing video/audio data transmissions. A first or primary port is dedicated for base quality transmissions on which the broadcasting client sends the lowest available quality. The systems and methods further dedicate multiple additional or secondary ports on which additional higher than base quality data is transmitted, which data is sent as "diff's" of the base quality. Receiving clientele combine the "diff" data transmitted via the secondary ports with the base data transmitted via the first or primary basal data port, to re-produce higher than base quality media output.

In a separate aspect, the systems and methods according to the present invention incorporate or build upon cube mapping methods of producing 360 video output. The cube mapping formatting according to these specifications send a unique frame for every face of a cubic viewpoint. Thus, for a 360 degree video, the systems contemplate six unique frames or cube faces per image. Each of the unique image frames or faces is sent along a unique data stream comprising a dedicated set of TCP or UDP ports, including a base quality port, and additional secondary "diff" ports for added quality as described above. The added or secondary ports transmit a "diff" of the base quality data and medium/high quality data.

The client application at the receiving client determines whether to use only base quality data, or whether to use higher quality data based on which direction the viewer is pointed or which of the cube faces is primary. This means that the client can constantly stream all faces of the cube at base quality, to ensure that frames are loaded as the viewer changes perspective. Additional quality data is selectively added to ensure that the view currently visible to the user is of the highest possible quality. A select data stream may be designated to contain audio data. The video stream containing audio data, may preferably be used to align music, or alternatively, an audio stream may be separately delivered on a parallel dedicated TCP or UDP port set.

BRIEF DESCRIPTION OF THE DRAWINGS

Other objects of the present invention, as well as particular features, elements, and advantages thereof, will be elucidated or become apparent from, the following brief descriptions of drawing figures submitted in support of these specifications.

DETAILED DESCRIPTION OF THE PREFERRED SYSTEM AND METHODOLOGY

Referencing the drawings now with more specificity, the present invention firstly and basically provides a Pulse Code Modulation or PCM patching or handling system and method. PCM patching is very basically a computer-implemented, application-based system supported by associated algorithms to reduce redundant PCM data within a digital storage system focused on storing PCM related content. A generic PCM storage facility is diagrammatically depicted and referenced at 20 in the several drawings submitted in support of these descriptions.

Figure 1A:
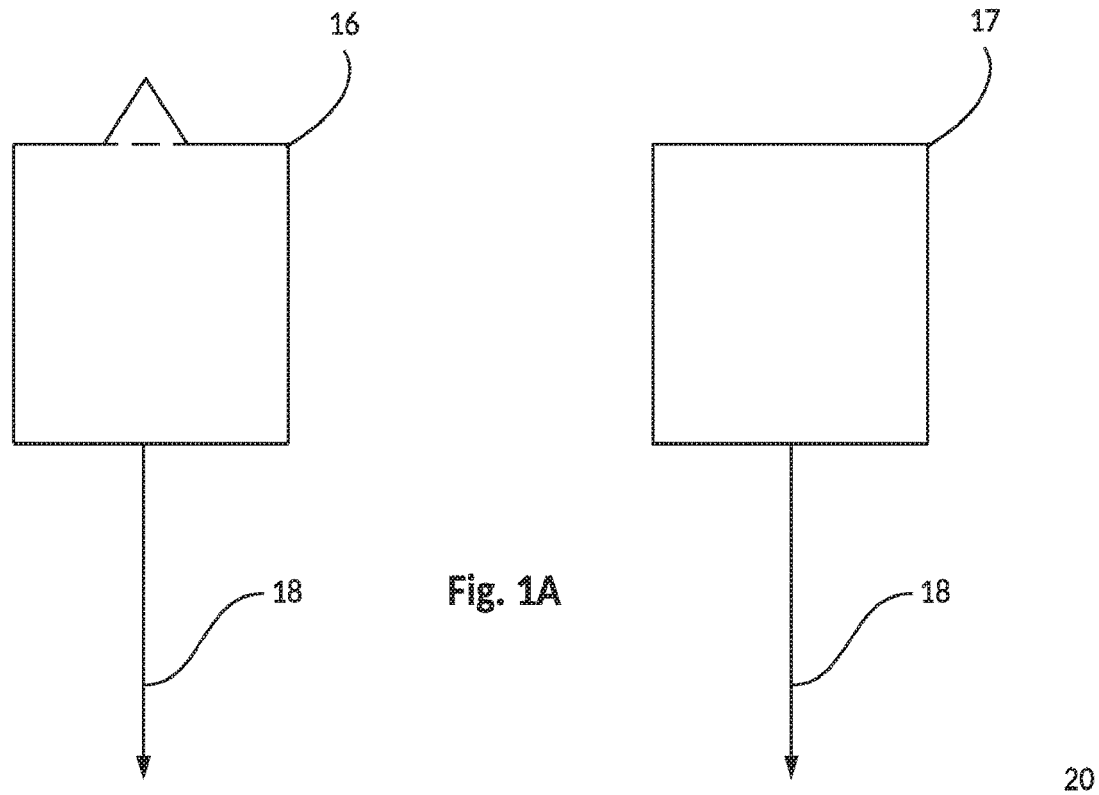
FIG. 1A is a simplified diagrammatic depiction of side-by-side first and second data files depicting the first data file being of a different size and shape as compared to the second data file.
Figure 1B:
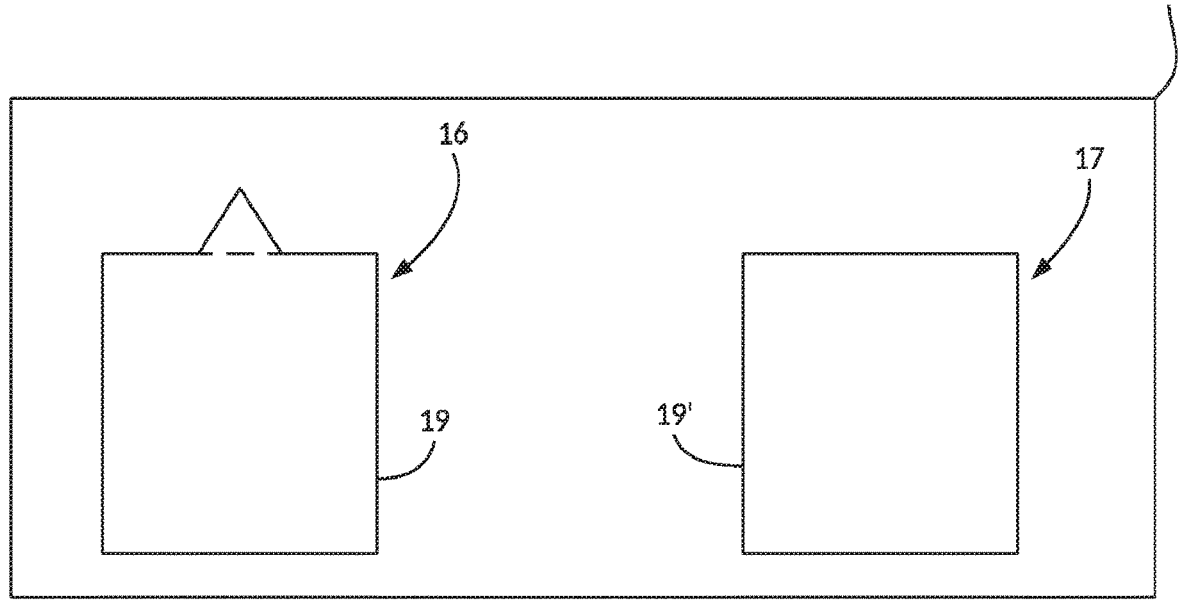
FIG. 1B is a simplified diagrammatic depiction of side-by-side first and second data files placed into a data file storage mechanism depicting the first data file and the second data file each having significantly sized and shaped portions of a similar or highly redundant size and shape.

Comparatively referencing FIGS. 1A and 1B, the reader will there consider a diagrammatically simplified first PCM data file as at 16, a diagrammatically simplified second PCM data file as at 17, and a diagrammatically simplified PCM data storage system 20. When the first and second PCM data files 16 and 17 are placed into the storage system 20 as at arrow(s) 18, the reader will there comparatively see that the first and second PCM data files 16 and 17 together comprise a significant amount of overlapping data as depicted by the square portions elements as at 19 and 19' of the two PCM data files 16 and 17. Square portion or element 19' may thus be viewed as redundant in view of square portion or element 19.

Figure 2A:
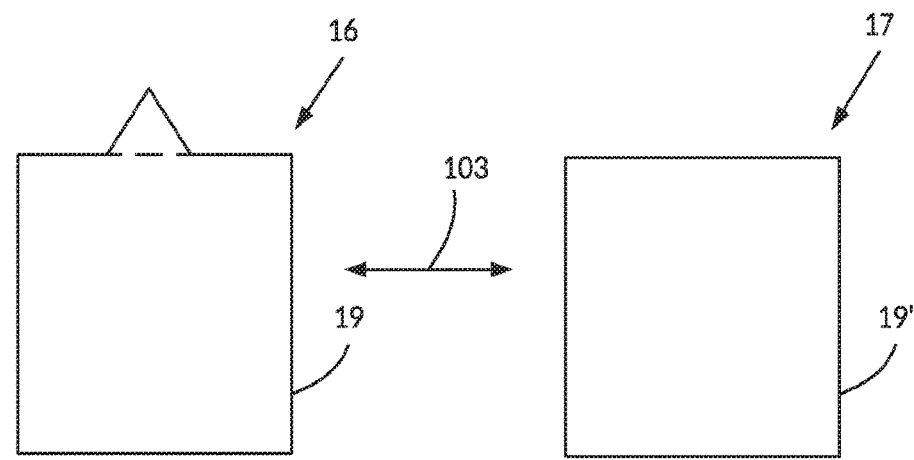
FIG. 2A is a simplified diagrammatic depiction of side-by-side first and second data files being compared for determining (a) those aspects of the first data file that are differently sized and shaped as compared to the second data file, and (b) those aspects of the first data file that are similarly or redundantly sized and shaped as compared to the second data file.
Figure 2B:
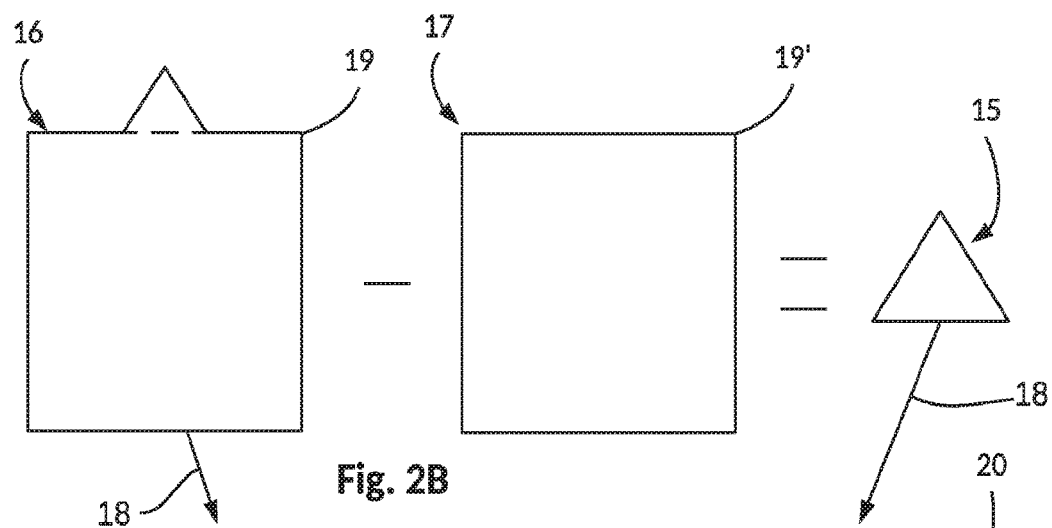
FIG. 2B is a simplified diagrammatic depiction of showing a data (size and shape) difference between the first and second data files.
Figure 2C:
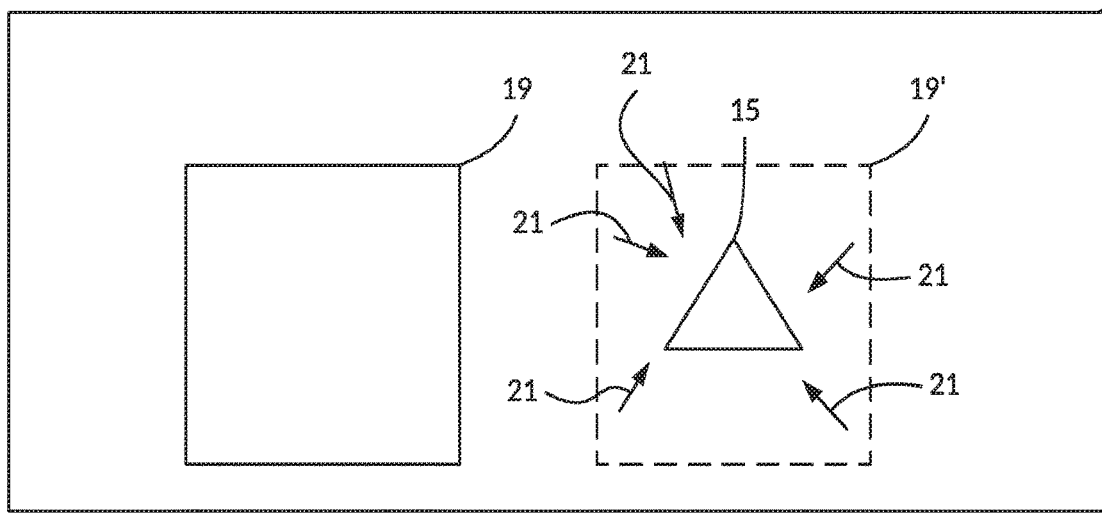
FIG. 2C is a simplified diagrammatic depiction of those similarly sized and shaped data file elements represented as a single square shape and the data difference between the first and second data files represented as a triangle being placed into the data file storage mechanism otherwise depicted in FIG. 1B comparatively depicting a reduction in data redundancy relative thereto.

Comparatively referencing FIGS. 2A-2C, the reader will there again consider a diagrammatically simplified first PCM data file 16, a diagrammatically simplified second PCM data file 17, and a diagrammatically simplified PCM data storage system 20. According to the core precepts of the data patching/handling aspects of the present invention, the first PCM data file 16 and second PCM data file 17 are preferably compared as at PCM data comparison process 103, during which process 103 redundant portions (as diagrammatically depicted at square portion 19') are determined and a PCM data difference 15 is output. A basal PCM data portion (as diagrammatically depicted at square portion 19) and the PCM data difference 15 may thus be placed into the data storage system 20 as at arrow(s) 18. Further comparing FIG. 1B versus FIG. 2C, the reader will there see that data redundancy has been reduced in FIG. 2C as compared to FIG. 1B which redundancy reduction is diagrammatically depicted and referenced at arrow(s) 21.

The PCM patching system and method according to the present invention thus require or are operable in combination with at least first and second media (audio) files for comparison purposes. The first and second media files are preferably stored as either raw PCM data or in a compressed form that decode to PCM data. A first raw PCM data file reflective of a first audio file is depicted and referenced at 11, and a second raw PCM data file reflective of a second audio file is depicted and referenced at 12 in FIG. 3. Further referencing FIG. 3, the reader will there also consider a first compressed PCM data file reflective of the first audio file as depicted and referenced at 13, and a second compressed PCM data file reflective of the second audio file as depicted and referenced at 14.

The PCM patching system and method according to the present invention may thus be said to preferably comprise a non-transitory, computer-implementable decompression application or decompression appliance for decompressing as at process 100 inputting 101 compressed first and second PCM data (audio) files 13 and 14. The compressed first and second PCM data (audio) files 13 and 14, being decompressed via the decompression appliance diagrammatically referenced at process 100, may be output 102 as the first and second raw PCM data files 11 and 12 as generally and preliminarily depicted at the beginning portions of the flowchart presented in FIG. 3.

The decompressed output PCM samples or data files 11 and 12 are then compared as at sample comparison process 103 via a non-transitory, computer-implementable PCM data comparison application believed central to the practice of the present invention. The non-transitory, computer-implementable PCM data comparison application is operable to (a) compare input 104 first and second PCM data files 11 and 12 respectively associated with first and second media or audio files; (b) calculate a PCM data difference 15 between the input first and second PCM data files 11 and 12, and (c) output 105 the calculated PCM data difference 15 between the first and second PCM data files 12 and 13 as a data difference file.

A non-transitory, computer-implementable PCM data compression application according to the present invention may then operate to both (a) compress the output calculated data difference 15 or data difference file and (b) store the compressed output calculated data difference 15 or data difference file in the data storage facility 20, which process(es) are denoted at process box 106. In data files that have very similar PCM data, for instance, if a file comparison were performed on the same audio track compressed to 256 kbs and 224 kbs, the difference between PCM values would be slight and indicative of high redundancy. Given a high degree of redundancy, standard compression algorithms can be applied so as to reduce the size of the data difference 15 or date difference file to 60-70% of the original compressed file size. The data difference 15 is preferably stored as a data difference file as passed through a compression algorithm as at process 106.

The data difference file or "diff" file 15 can then be used to losslessly reproduce the PCM data of either the first or second earlier compared media (audio) files. The PCM patching system and method according to the present invention may thus be said to further and preferably comprise a non-transitory, computer-implementable PCM data restoration application operable to losslessly reproduce a select PCM data file as selected from the group consisting of the first and second PCM data files 11 and 12 by way of the compressed output calculated data difference 15 or data difference file.

Figure 3:
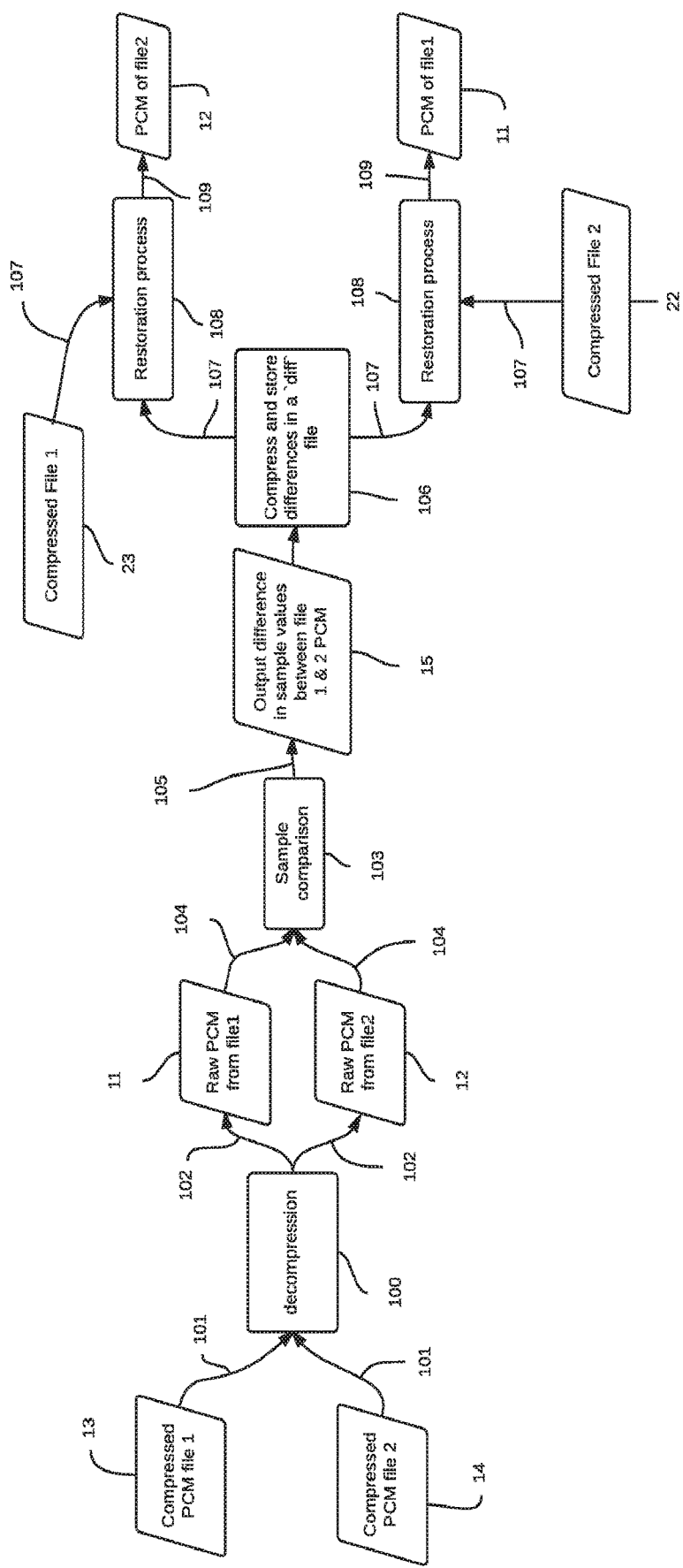
FIG. 3 is a flowchart diagram depicting a Pulse Code Modulation or PCM patching system and process according to the present invention.

In this regard, the PCM data restoration application is operable to losslessly reproduce or output 109 via a restoration process 108 (a) the first PCM data file 11 via input 107 (i) compressed second (audio) file data 22 and (ii) the compressed output calculated data difference 15 or data difference file and (b) the second PCM data file 12 via input 107 (i) compressed first (audio) file data 23 and (ii) the compressed output calculated data difference 15 or data difference file as generally depicted in FIG. 3. The PCM patching system and method according to the present invention typically enables a 60-70% size reduction of the original compressed file, while further providing the ability to losslessly reproduce the PCM data of the original files.

Figure 4:
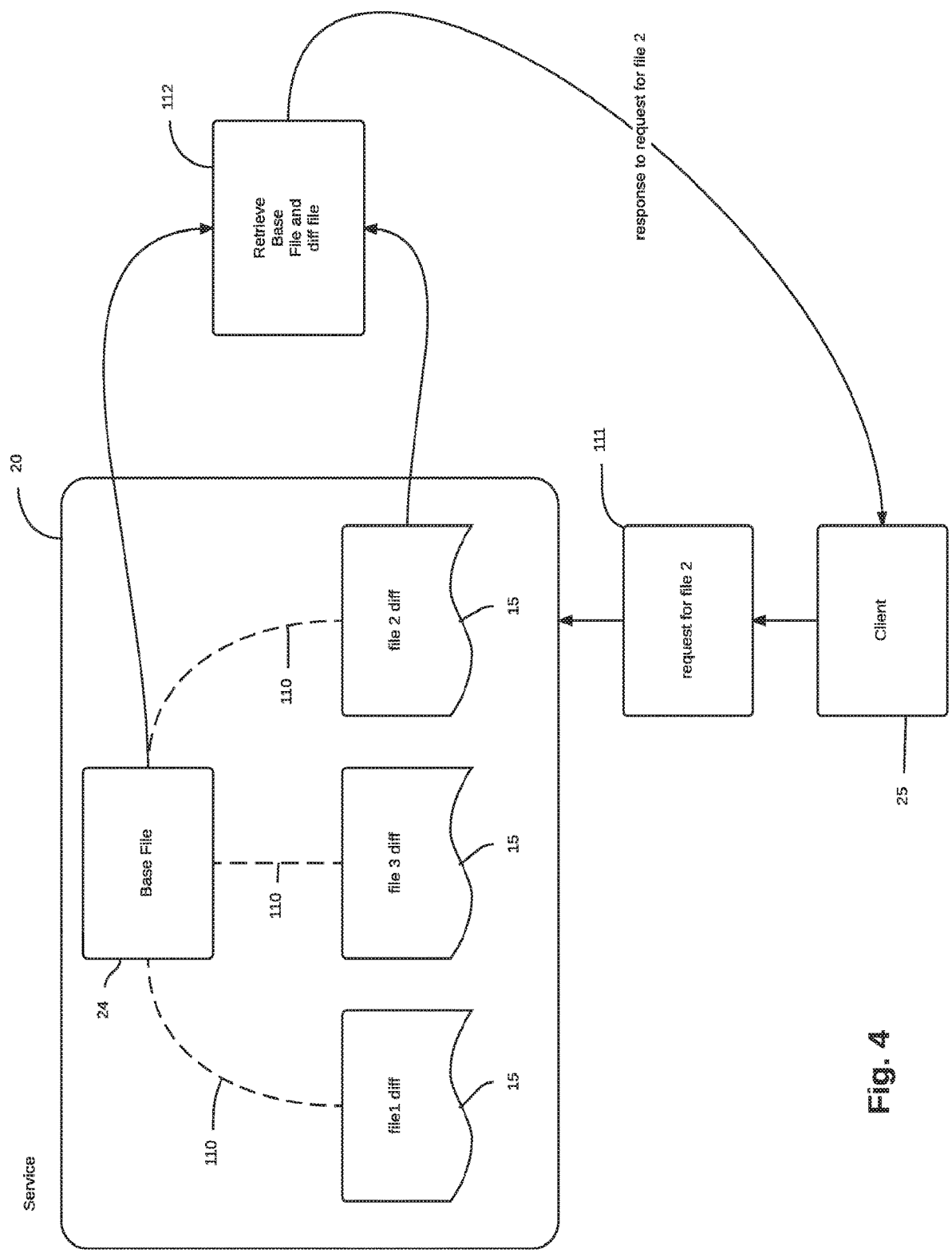
FIG. 4 is a flowchart diagram depicting a data storage system and process according to the present invention.
Figure 4A:
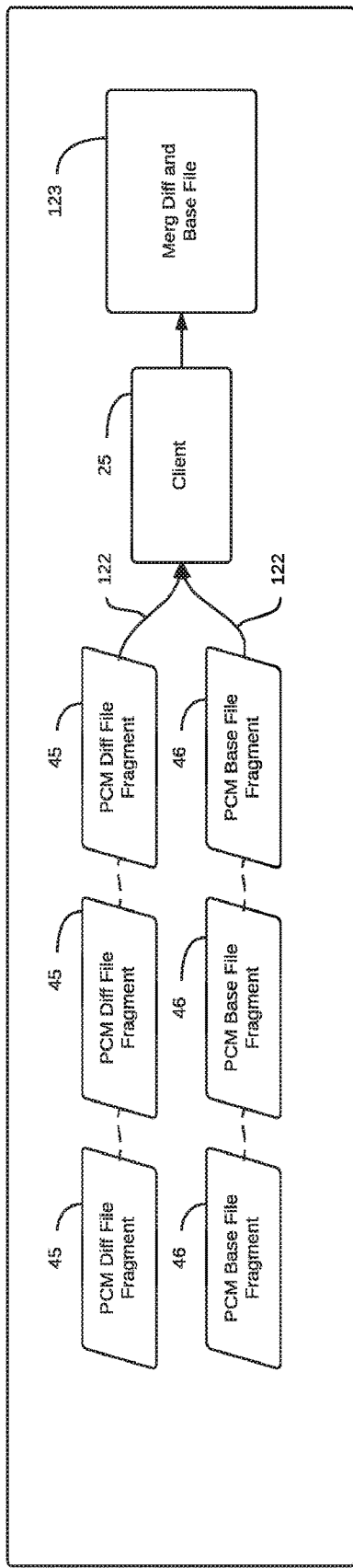
FIG. 4A is a flowchart diagram depicting a first alternative data retrieval/return system and process according to the present invention.

The storage system or mechanism 20 according to the present invention preferably maps 110 base file data 24 to data difference file data 15. A data difference file 15 stores the difference in PCM data between the base file 24 and the originally uploaded media (audio) file. Referencing FIG. 4, the originally uploaded file may be referenced as "file 2". On request 111 from a compatible client 25, the storage system 20 returns as at generic process 112 both (a) the base file data 24 and (b) "file 2 diff" data 15. The client 25 then uses the collection of data to re-produce the PCM data of the original file. The retrieval or return process 112 may operate by way of a number of different mechanisms, including the following exemplary mechanisms, as denoted at 112A and 112B in FIGS. 4A and 4B, respectively.

A first exemplary retrieval mechanism or process 112A according to the present invention provides for fragmentation of all "diff" files or data difference files 15 into smaller "diff" file fragments 45 deliverable as at process 122 to the client 25 incrementally to incrementally patch the PCM data before it is reproduced. Referencing FIG. 4A, the reader will there consider process retrieval/return mechanism 112A depicting PCM "diff" file fragments 45 and PCM base file fragments 46 delivered 122 to the client 25 outfitted with a non-transitory computer-implementable application to merge the PCM "diff" file and base file fragments 45 and 46 as at process 123.

Figure 4B:
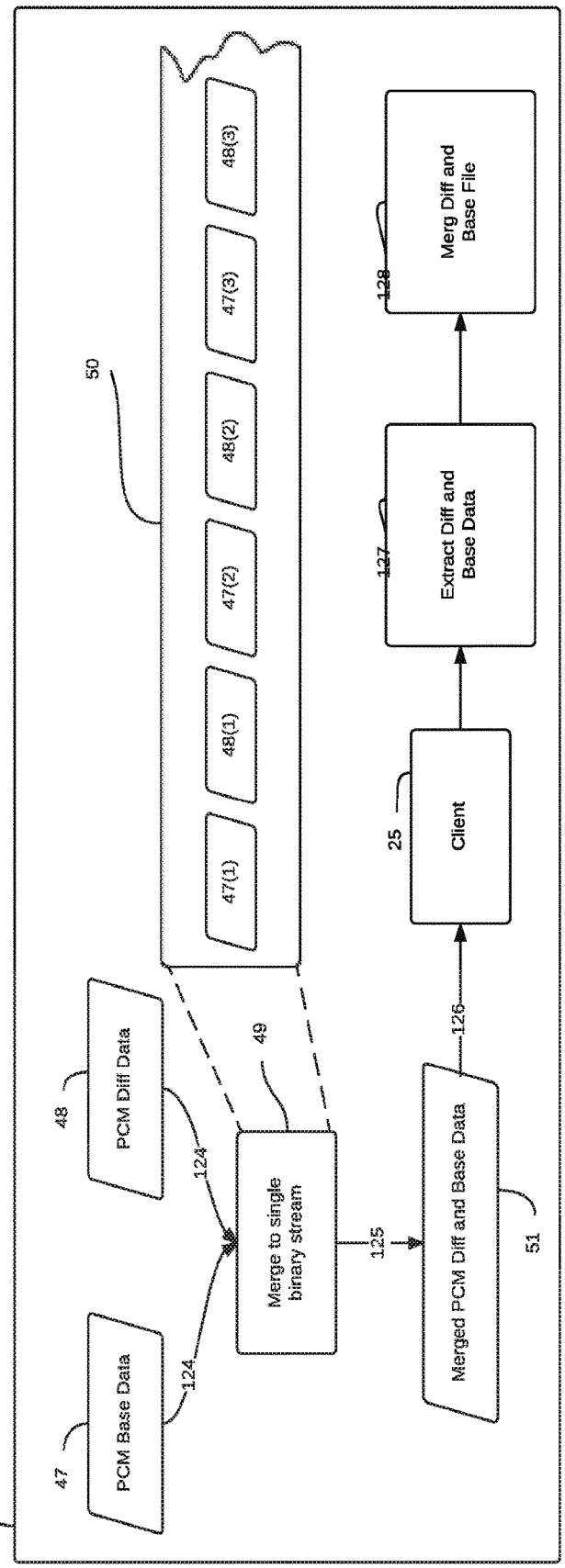
FIG. 4B is a flowchart diagram depicting a second alternative data retrieval/return system and process according to the present invention.

A second exemplary retrieval/return mechanism 112B according to the present invention returns PCM base data 47 and PCM "diff" data 48 in a single binary stream 49, mixing or merging (as at segment-merged data chain 50) the input 124 PCM "diff" data 47 with PCM base file data 48 in consistent and alternating intervals as in FIG. 4B. For example, the first 100 kb of the binary stream represents the first segment 47(1) of the PCM base file 47, while a successive 100 kb represents the first segment 48(1) of the PCM "diff" file 48. The system thus alternates between PCM base and "diff" data segment(s) 47/48 delivery every 100 kb and outputs 125 as a merged PCM "diff" and base data stream 51 comprising the segment-merged PCM data chain 50 deliverable 126 to the client 25 where PCM "diff" and base data 47 and 48 may be extracted as at process 127 and re-merged as at process 128. Other methods for delivering the data in a single binary data stream are possible.

The PCM patching or handling system and method according to the present invention thus provide for lossless restoration of a select PCM data file as initiated via a client 25 requesting 111 a select data file from server-based data file storage 20. A base data file 24 and a corresponding compressed output calculated data difference file 15 are returned 112 to the client 25 from the server-based data file storage 20. PCM data of the requested select data file are re-produced at the client 25 via the computer-implemented, non-transitory data restoration application generally depicted and referenced at process 108. The compressed calculated data difference file data 15 may be fragmented and delivered to the client 25 incrementally to incrementally patch file-representative PCM data while being re-produced, or PCM data may be returned in a single binary stream such that base file data and the compressed output calculated data difference file data are mixed and delivered in consistent and alternating intervals as at segment-merged data chain 50.

Figure 5:
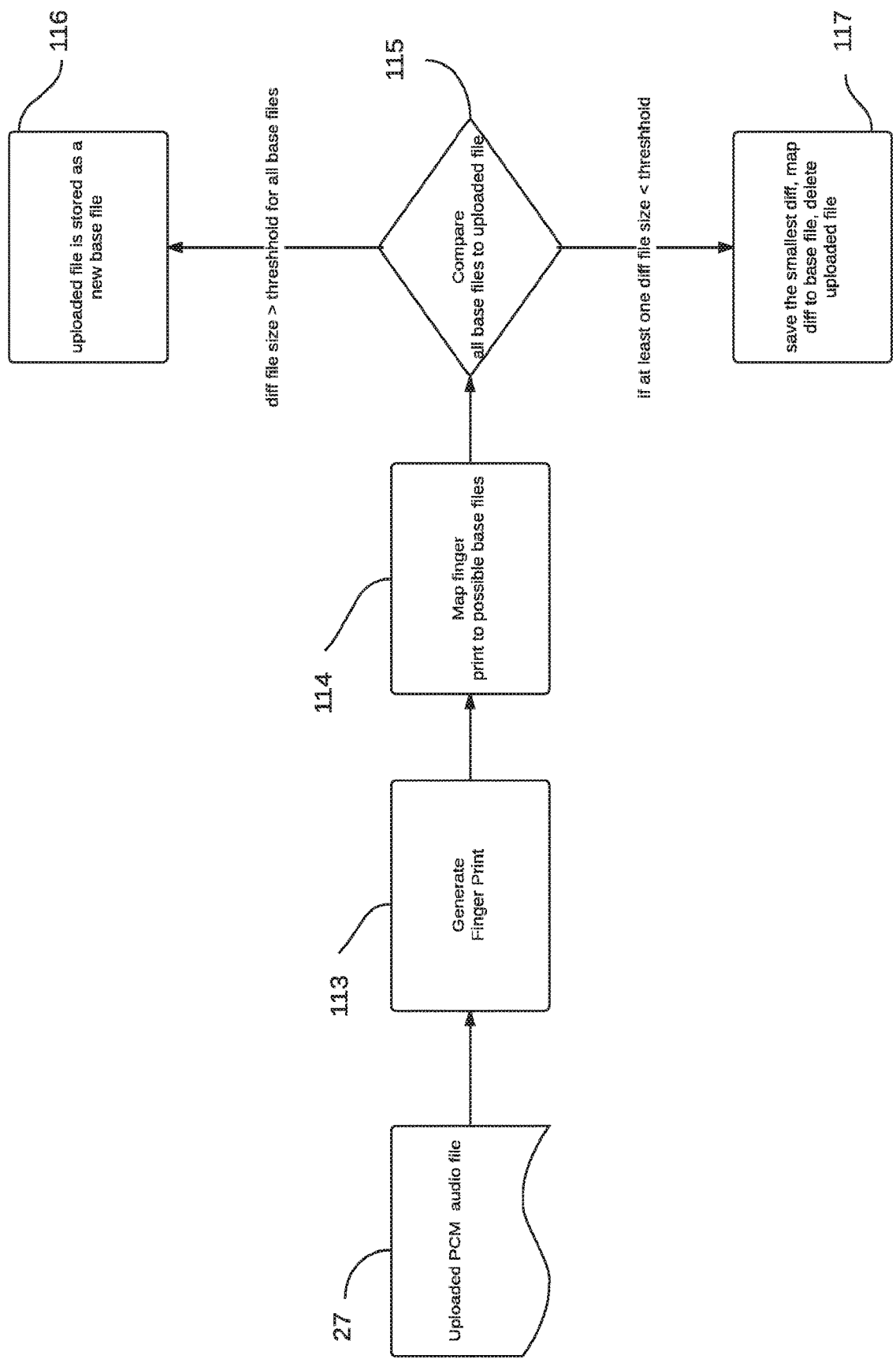
FIG. 5 is a flowchart diagram depicting a base file mapping system and process according to the present invention.

Referencing FIG. 5, the reader will there consider that before the system and/or method stores and generates data difference files or "diffs" 15 off of base files, the system or method first maps 114 the data difference files or "diffs" 15 to possible matches via a media or audio file fingerprinting (identifying) mechanism/application as at process 113. All base files that have similar fingerprints or file-identifying characteristics to the uploaded file are possible base file candidates. To identify the optimal base file, the system and method generate "diffs" off of all base files; and compare each "diff" size to an established threshold value as at query process 115. If all "diffs" exceed the threshold value, the uploaded file 27 becomes a base file as at path process 116. If one or more "diffs" are determined to be below the threshold value, the "diff" file of least value is stored, and the original file is deleted as at path process 117.

Figure 6:
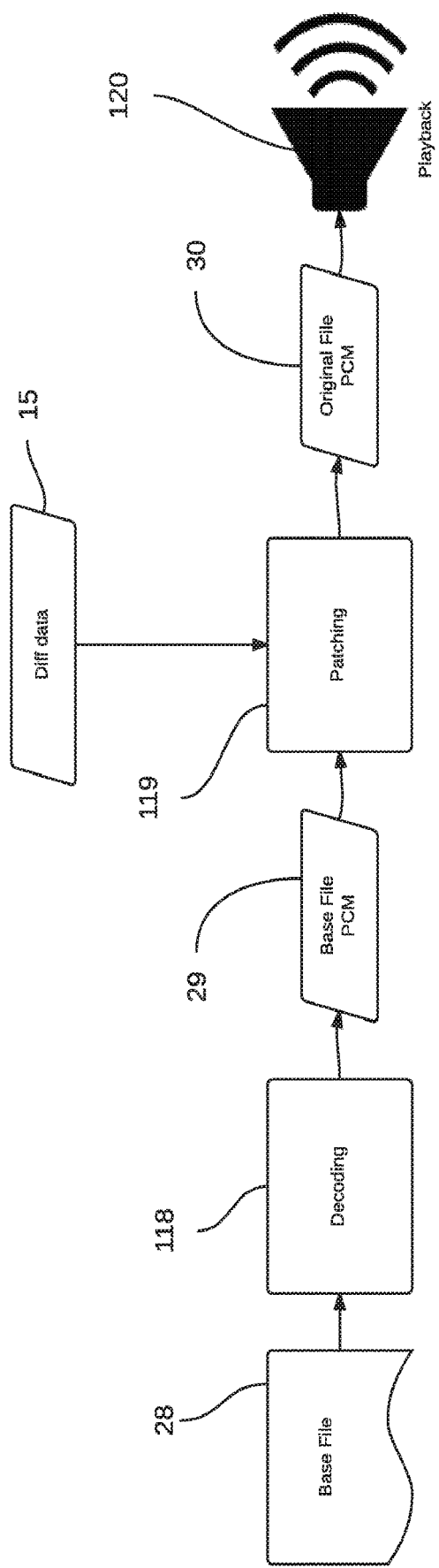
FIG. 6 is a flowchart diagram depicting a PCM data difference playback system and process according to the present invention.

Referencing FIG. 6, it will be seen that media or audio playback for the "diff" system and method according to the present invention requires the following steps (a) decoding a base file 28 to PCM data 29 via decoding process 118; (b) patching the base file PCM data 29 with data from the "diff" file 15 via patching process 119 thereby forming patched PCM data output 30 (i.e. original file PCM); and (c) sending the patched PCM data output 30 or original file PCM for media/audio playback as at playback process 120. File playback 120 according to the present system and method is thus accomplished by decoding a base file to base file PCM; patching the base file PCM with calculated PCM data difference file data to form an original PCM file; and sending the patched base file PCM for playback as the original PCM file.

It is noted that many real-time protocols rely on Secure Real-time Transport Protocol or SRTP and that quality adjustments are typically made by calls back to the sending device to ensure a consistent quality. This method, however, tends to result in lower overall quality transmissions, since (i) the slowest client will often determine or dictate the quality transmitted to all clients, and (ii) the sending device will adjust the quality based on the ability of the receiving client(s) to receive and process data in time.

Figure 7:
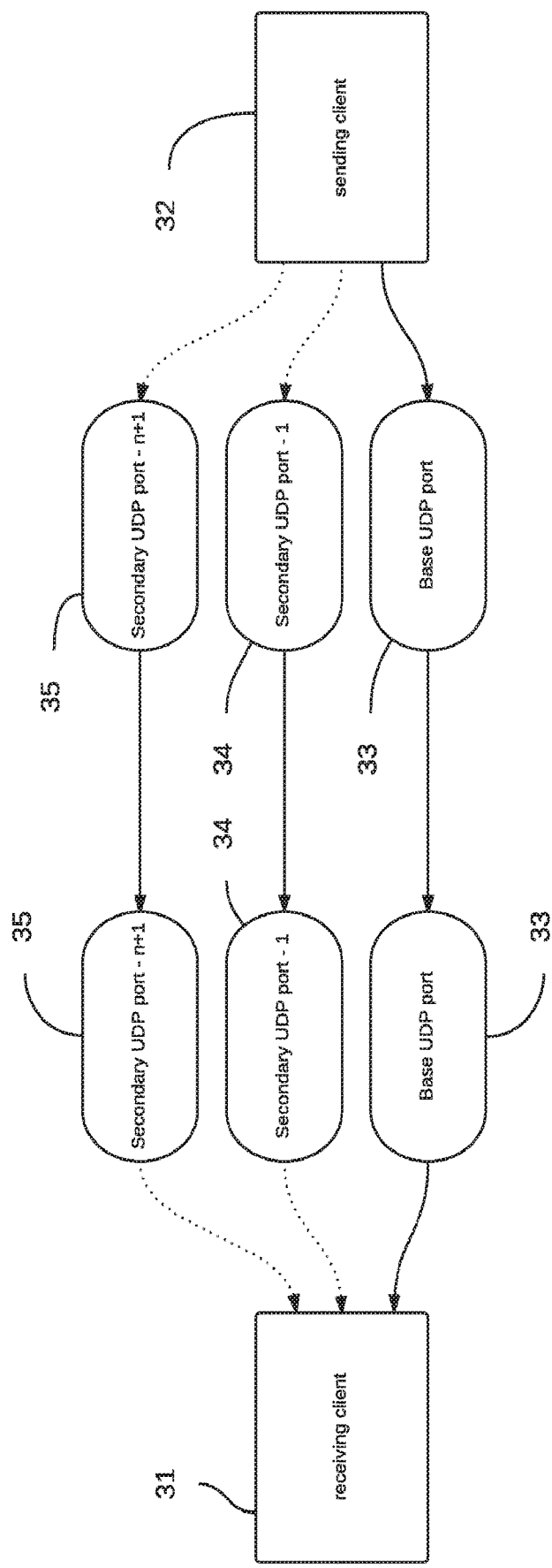
FIG. 7 is a flowchart diagram depicting a sending client and a receiving client each outfitted with a multi-port data transmission arrangement according to the system and process of the present invention.

To remedy these shortcomings, the system and method according to the present invention rely on multiple Transmission Control Protocol (TCP) or User Datagram Protocol (UDP) ports for video/audio data transmission as generally depicted and referenced in FIG. 7. Referencing FIG. 7, it will be seen that a receiving client computer and a sending client computer are there depicted as at 31 and 32, respectively. Each of the receiving client computer 31 and the sending client computer 32 according to the present system and method is outfitted or configured with a non-transitory, computer-implementable data transmission application with multiple TCP or UDP port capability, including a basal or primary TCP or UDP port arrangement as at 33, and at least one higher than basal or secondary TCP or UDP port arrangement as at 34 and/or 35.

The primary or basal TCP or UDP port(s) 33 are dedicated to base quality transmission via which the broadcasting client 32 sends and the receiving client 31 receives the lowest available quality data transmission. The system further dedicates at least one, but preferably multiple additional or secondary TCP or UDP ports as at 34 and/or 35 via which additional (higher or better than basal) data may be transmitted. The additional TCP or UDP port mechanisms as at 34 and 35, in combination with the basal TCP or UDP port(s) 33, are thus used to increase the quality of base data transmissions. Data transmissions via TCP or UDP ports 34 and/or 35 are preferably sent as "diff" data 36 or 37 of the base quality data 38 as further comparatively referenced in FIG. 8.

Figure 8:
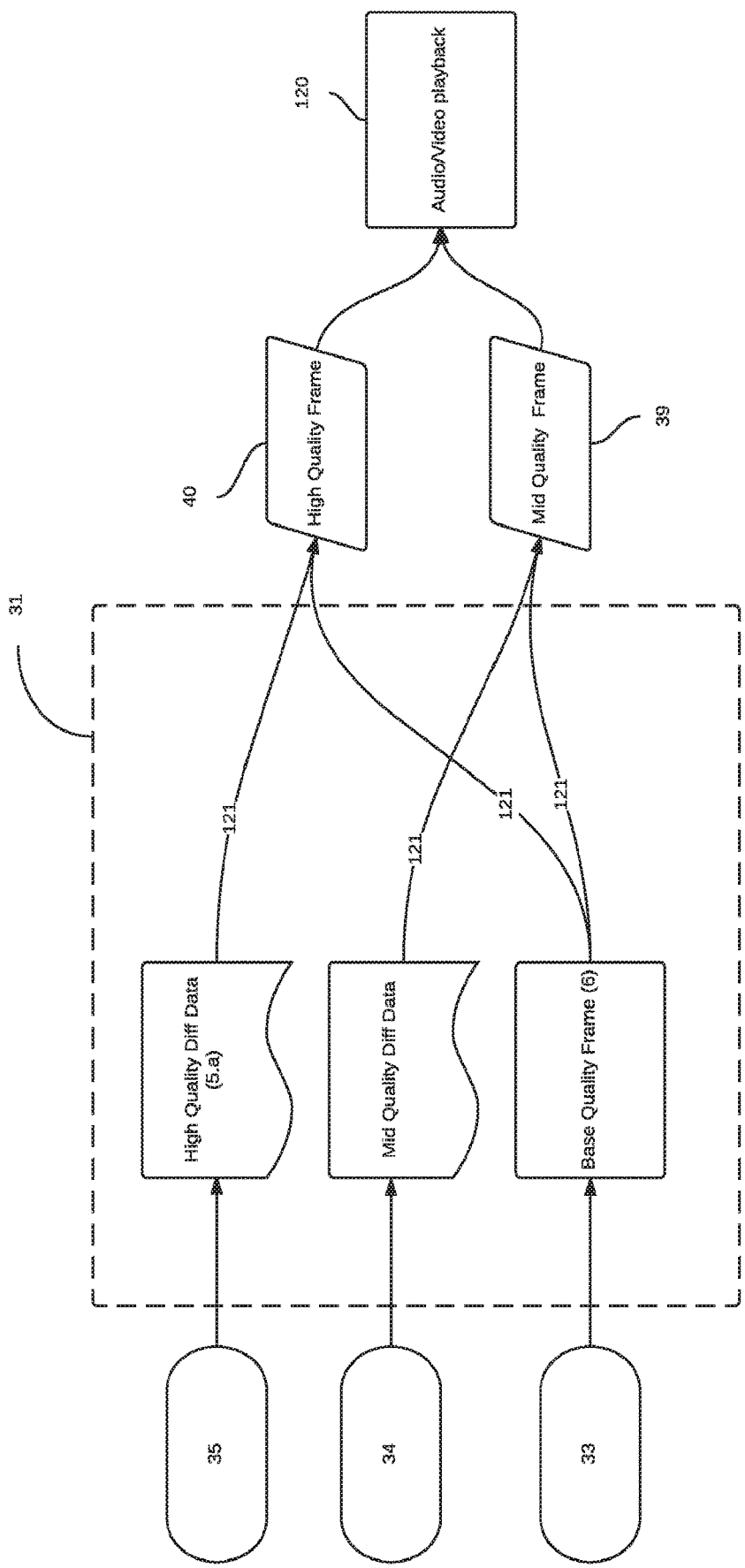
FIG. 8 is a flowchart diagram depicting a receiving client outfitted with a multi-port data transmission arrangement according to the system and process of the present invention and selectively (a) merging (1) base quality frame data transmitted via a base quality port with either (i) mid-quality frame data transmitted via a first secondary port or (ii) high quality frame data transmitted via a second secondary port and (b) outputting either (1) a mid-quality frame for playback or (2) a high quality frame for playback.

Referencing FIG. 8, the reader will there consider that the receiving client 31 combines as at process(es) 121 "diff" data of either a mid-quality "diff" data 36 or high-quality "diff" data 37 via either of the secondary TCP or UDP ports 34 or 35 with the base data 38 of the primary or basal TCP or UDP port 33, to produce higher than basal quality media as at 39 or 40 for audio/video playback as at 120. The "diff" data as at 36 or 37 and base data 38 are preferably synchronized via either time stamp methodology or via binary hash methodology of either audio or video frame (exemplified by CRC-64 or MD5). The binary hash is attributed to the "diff" data 36 or 37 and generated off of the base data 38. This type of system allows the sending client 32 to send higher quality data as it is able, since only the base file data 38 are required to maintain the session. Further, the system allows the receiving client 31 to listen and receive as it is able on the secondary ports 34 and/or 35 if it is able to receive a broadcast of higher quality.

File data are thus preferably transmitted via the system and method according to the present invention intermediate a sending client 32 and a receiving client 31 via at least two TCP or UDP ports, including a basal TCP or UDP port 33 of the at least two TCP or UDP ports being dedicated for base quality transmission and at least one secondary TCP or UDP port as at 34 or 35 of the at least two TCP or UDP ports being dedicated for data difference file data transmission. The base quality and data difference file data transmissions are synchronized at the receiving client 31 for producing higher than basal quality output. The base quality and data difference file data transmissions may be preferably synchronized at the receiving client 31 via either a timestamping mechanism, or a binary hash mechanism, the binary hash mechanism being attributed to the data difference file data as generated from the base quality data.

The following descriptions explain how the progressive and adaptive quality mechanisms described above may be utilized to lower latency with high quality real time 360 video transmissions further contemplated by the present system and method as an aspect stemming from the multi-port data transmission ports hereinabove discussed. Noting that 360 degree video playback may occur via several image-stitching methods, the present system and method preferably contemplates usage of cube-mapping methods for producing 360 videos. The cube mapping format according to the present invention sends a unique frame for every cube face 41 of a cubic viewpoint as at 40, and thus for a 360 video, the system and method contemplates six unique frames per 360 degree image as at cube faces or frames 41.

Figure 10:
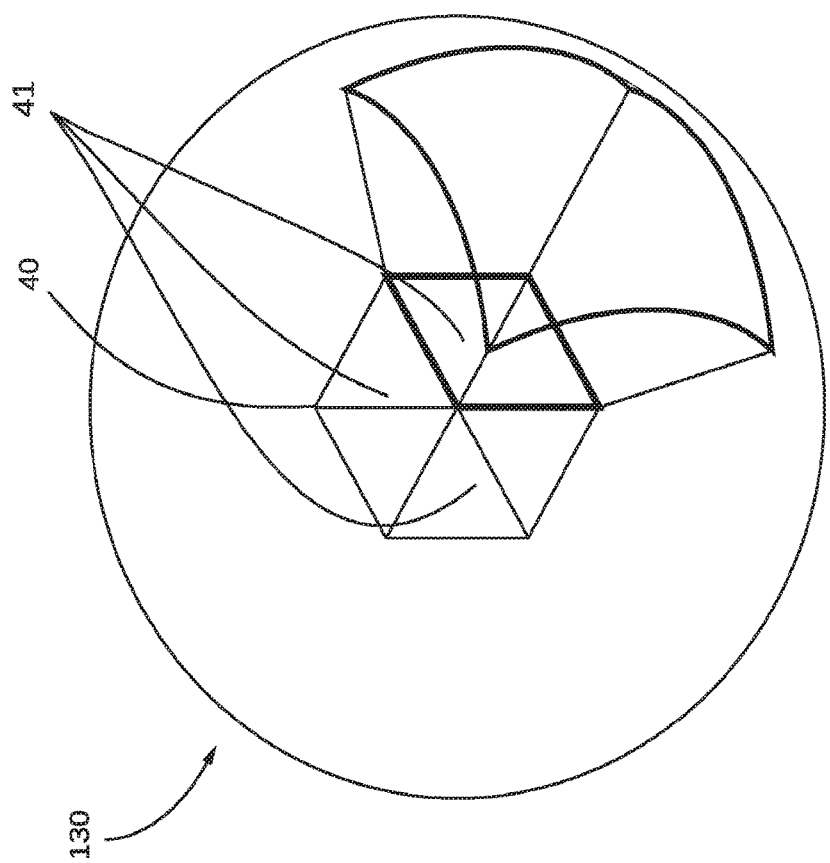
FIG. 10 is a diagrammatic perspective depiction of the viewpoint enlarged to show an internal cube with a first face of the internal cube highlighted in bold lining with a depiction of a corresponding spherical surface area.
Figure 9:
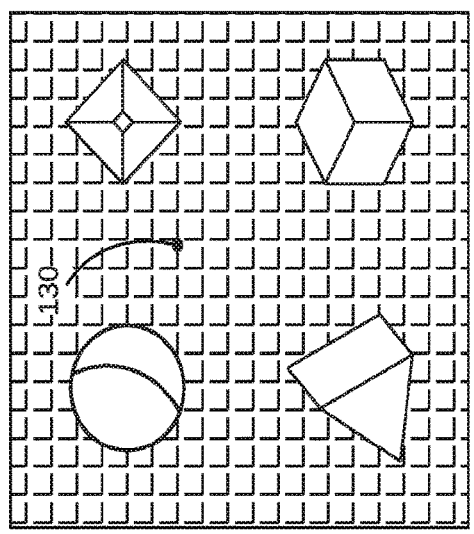
FIG. 9 is a diagrammatic perspective depiction of a viewpoint marked with a black dot and showing objects located in 90 degree intervals relative to the viewpoint.
Figure 11:
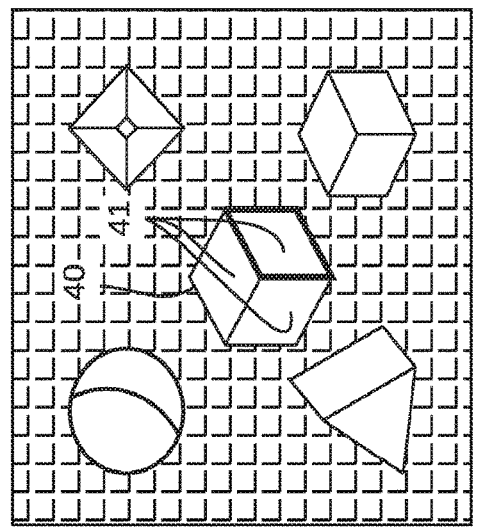
FIG. 11 is a diagrammatic perspective depiction of the scene otherwise depicted in FIG. 9 with the internal cube superimposed at the original viewpoint with a series a cube faces opposing each of the objects in the scene.
Figure 12:
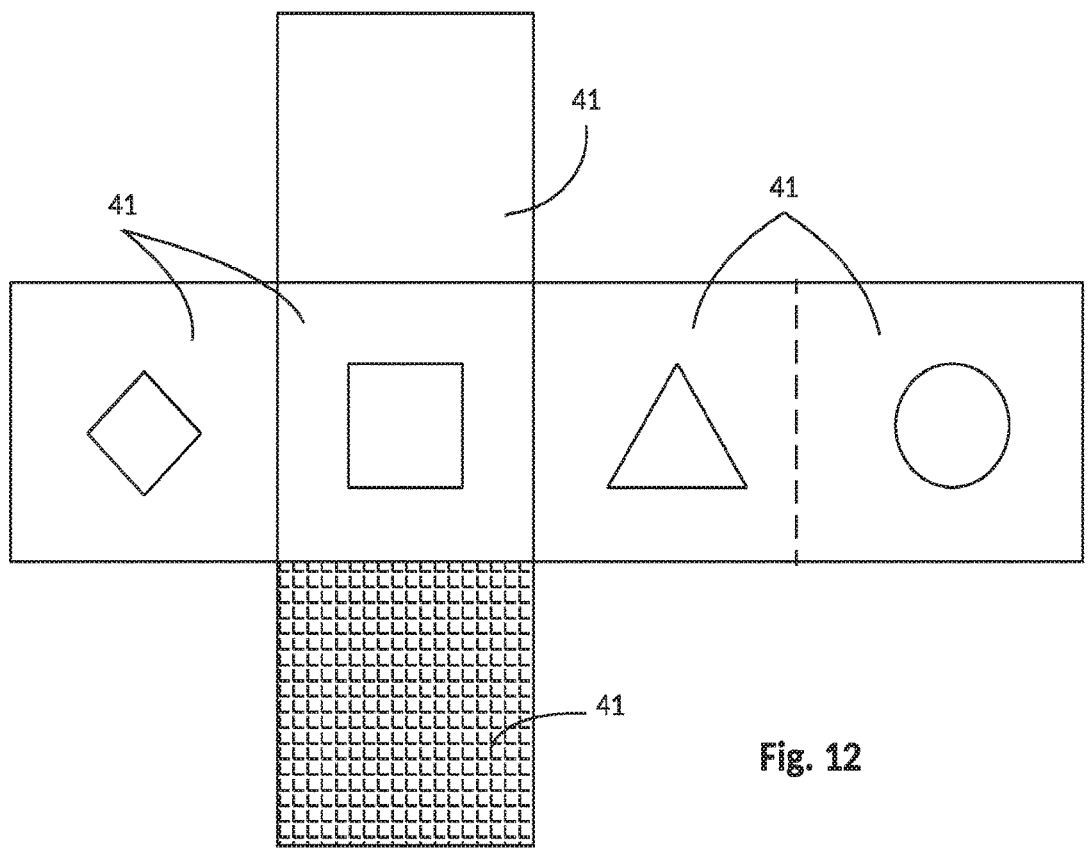
FIG. 12 is a diagrammatic net depiction of the scene otherwise depicted in FIGS. 9 and 11 as seen from the original viewpoint.

While images of this sort are typically sent in a single data stream, the system and method according to the present invention send each face or frame 41 of the cube 40 along a unique data stream comprising a dedicated multi-port set of TCP or UDP ports, including a basal or primary TCP or UDP port 33 and a secondary or base-plus TCP or UDP port as at 34 or 35. Referencing FIGS. 9 and 10, the reader will there consider viewpoint 130. Referencing FIG. 10, the highlighted cube face 41 represents a single view of the cubic viewpoint 40. Each single view associated with a cube face 41 has a dedicated multi-port set of TCP or UDP ports, including a base quality or primary TCP or UDP port 33, and additional secondary TCP or UDP ports as at 34 or 35 for added quality as described above.

The added secondary TCP or UDP ports as at 34 and/or 35 transmit "diff" data 36 or 37 of the base quality data 38 preferably corresponding with medium/high quality data. The non-transitory, computer-implementable data transmission application at receiving client computer 31 determines whether to utilize only the base quality data, or whether to add higher quality data based on which direction the viewer is pointed or which cube face 41 is in play. This means that the receiving client computer 31 is able to constantly stream all faces or frames 41 of the cube 40 at base quality to ensure that frames are loaded as the viewer changes perspective. Additional quality data may be added to ensure that the view currently visible to the user is at the highest possible quality. This methodology further enhances a high quality view it being noted that high quality data need only be delivered for a select few of the cube faces or frames 41 as opposed to all six faces or frames 41 of the cube 40.

Figure 13:
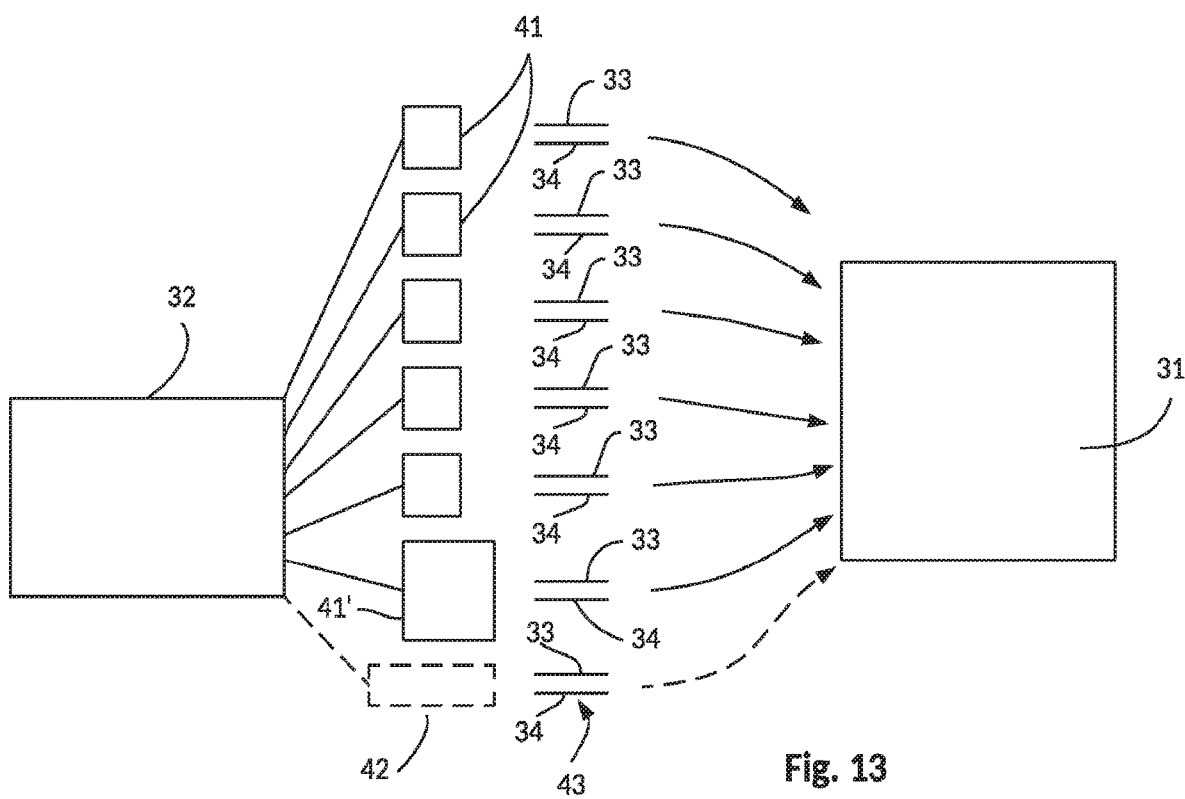
FIG. 13 is a flowchart diagram depicting a sending client and a receiving client with cube mapping data being transmitted therebetween, the cube mapping data comprising data for each cube face of a cube mapping protocol, the data for each cube face being transmitted via a multi-port arrangement including a base quality port and at least one secondary, higher than base quality port, a select cube face being enlarged in size relative to other cube face depictions to depict a first alternative combination video-audio transmission channel and a broken rectangle to depict a second alternative separate audio transmission channel.

Since all data in a 360 video is transmitted on different ports according to the system and method of the present invention, a select data stream may be preferably dedicated to further contain audio data transmissions whereby a select face or frame 41 and an audio stream are combined and transmitted via a TCP or UDP basal port and secondary port set as diagrammatically depicted at relatively larger square 41' in FIG. 13. The stream containing audio data is used to align music as preferably synchronized and/or reproduced using methods discussed in greater detail within the specifications set forth in U.S. patent application Ser. No. 15/407, 192 ('192 Application) incorporated herein by reference thereto. An alternative method of audio data transmission is to deliver an audio data packet 42 on a separate dedicated TCP or UDP multi-port set as at 43 in FIG. 13. Either method may operate in cooperation with the methods otherwise described in the '192 Application.

The PCM patching or handling system and method according to the present invention may thus be described as operable to transmit video data via a cube mapping mechanism, which cube mapping mechanism utilizes six cube faces of a cubic viewpoint for compiling a 360 degree map shape or panorama. The video data associated with each cube face is preferably transmitted intermediate a sending and receiving client via a basal TCP or UDP port and at least one secondary TCP or UDP port. Audio data may be selectively and simultaneously transmitted with the video data, and either appended to a select cube face video transmission as at cube face or frame 41' or transmitted in parallel to the video data via a dedicated basal and secondary TCP or UDP multi-port set as at 43.

While the above descriptions contain much specificity, this specificity should not be construed as limitations on the scope of the invention, but rather as an exemplification of the invention. For example, it is contemplated that the present invention may essentially be said to firstly provide a data handling system and/or method operable within a computing environment for reducing redundant data within data storage. The systemic aspects of this aspect of the present invention may be said to center on server-based data storage, a first non-transitory, computer-implementable data comparison application, and a second non-transitory, computer-implementable data compression application.

The non-transitory, computer-implementable data comparison application is operable to (a) compare input first and second data files respectively associated with first and second audio files, (b) calculate a data difference between the input first and second data files, and (c) output the calculated data difference between the first and second data files as a data difference file. The non-transitory, computer-implementable data compression application is operable to (a) compress the data difference file and (b) store the data difference file in the data storage thereby reducing data redundancy within the data storage.

A third non-transitory, computer-implementable data restoration application is operable to losslessly reproduce a select data file from the group consisting of the first and second data files via the data difference file. More particularly, the data restoration application is operable to losslessly reproduce (a) the first data file via input (i) compressed second audio file data and (ii) the data difference file, and (b) the second data file via input (i) compressed first audio file data and (ii) the data difference file. Lossless restoration of a select data file is initiated via a requesting client by requesting a select data file from the server-based data storage whereafter a base data file and the data difference file are together returned to the requesting client from the server-based data storage; and data of the requested select data file is re-produced at the requesting client.

The data difference file may be either fragmented/delivered to the requesting client incrementally to incrementally patch the select data file while being re-produced, or returned in a single binary stream. In the latter instance, the base data file and the compressed output calculated data difference file are mixed and delivered in consistent and alternating intervals. File playback is accomplished by decoding a base file to base file data; patching the base file data with the data difference file to form a patched base file; and sending the patched base file for playback as the original file.

File data may be preferably transmitted intermediate a sending client and a receiving client via at least two data transmission ports, a basal port of the at least two data transmission ports being dedicated for base quality transmission and at least one secondary port of the at least two data transmission ports being dedicated for data difference file transmission. The base quality and data difference file transmissions are preferably synchronized at the receiving client for producing higher than basal quality output via a base quality file and "diff" file synchronization tool at the receiving client.

Viewed methodologically, the present invention provides a data handling or patching method for reducing redundant data within data storage. The patching method may be said to essentially comprise the steps of: inputting first and second data files respectively associated with first and second audio files into a computer-implemented, non-transitory, data comparison application; comparing the input first and second data files via the computer-implemented, non-transitory data comparison application; calculating a data difference between the compared first and second data files via the computer-implemented, non-transitory data comparison application; and outputting into a data storage facility the calculated data difference as a data difference file via the computer-implemented, non-transitory data comparison application.

The data difference file may be preferably compressed and stored via a computer-implemented, non-transitory data compression application; and a select data file from the group consisting of the first and second data files may be losslessly restored via a computer-implemented, non-transitory data restoration application, the select data file being losslessly restored via the compressed data difference file. The step of losslessly restoring a select data file from the group consisting of the first and second data files may be said to comprise the steps of: requesting via a requesting client a select data file from server-based data file storage and returning a base data file and the compressed data difference file to the requesting client from the server-based data file storage.

Certain data of the requested select data file may be re-produced at the requesting client via the computer-implemented, non-transitory data restoration application. The compressed data difference file may be fragmented and delivered to the requesting client incrementally to incrementally patch the select data file while being re-produced, or alternatively returned in a single binary stream with the base data file and the compressed data difference file being mixed and delivered in consistent and alternating intervals.

The data handling method may preferably comprises a series of preliminary steps, including uploading a select data file to a non-transitory, computer-implementable file-identifying (e.g. fingerprinting) generation application; generating an file-identifier (e.g. a fingerprint) for shorthand-identifying the uploaded select data file; mapping the file-identifier to possible base files; and comparing all base files to the uploaded select data file. Thus, an optimal base file may be identified by generating a data difference file value for each base file; and comparing the data difference file values to an established threshold value. Those data difference file values exceeding the threshold value denote corresponding uploaded files as base files, and those data difference file values less than the threshold value are deleted except for a lowest data difference file value, which is saved and mapped to a corresponding base file.

File playback may be said to preferably comprise a series of playback steps, including decoding a base file to base file data; patching the base file data with the data difference file thereby forming a patched base file; and sending the patched based file for playback as the original file. File data transmitted intermediate a sending client and a receiving client are preferably transmitted via at least two data transmission ports. A basal port of the at least two data transmission ports is dedicated for base quality transmission and at least one secondary port of the at least two data transmission ports is dedicated for data difference file transmission. Base quality and data difference file transmissions are synchronized at the receiving client via a synchronization tool for producing higher than basal quality output.

In a separate aspect of the present invention, video data, preferably transmitted via cube mapping methodology, is transmitted via the multi-port arrangement here described, including a basal data transmission port and the at least one secondary data transmission port for transmission of each cube face or frame for compiling an entire map shape. Video data may be preferably transmitted via a cube mapping mechanism or application such that individual cube faces operate to compile the map shape. Video data associated with each individual cube face are transmitted via the basal port and the at least one secondary port. Audio data may be selectively and simultaneously transmitted with the video data, and firstly and alternatively appended to a select cube face video transmission or secondly and alternatively transmitted in parallel to the video data via a dedicated basal and secondary multi-port set.

Accordingly, although the inventive system and method have been described by reference to a number of varying exemplary systems and methodologies, it is not intended that the data handling and transmission systems and methods be limited thereby, but that modifications thereof are intended to be included as falling within the broad scope and spirit of the foregoing disclosure, the following claims, and the drawings, both diagrammatic and illustrative, submitted in support of these specifications.

What is claimed is:

1. A data transmission system for enhancing quality of data transmissions, the data transmission system being operable within a computer-based network environment and comprising:

a sending client computer and a receiving client computer within the computer-based network environment, the sending and receiving client computers each being outfitted with a non-transitory, computer-implementable data transmission application and at least two data transmission ports, a basal port of the at least two data transmission ports being dedicated for base quality data transmission and at least one secondary port of the at least two data transmission ports being dedicated for data difference file transmission;

data difference file transmissions being derived from compared data difference sizes, data difference sizes all exceeding an established threshold value denoting a new base file designation for transmission via the at least one secondary port, data difference sizes determined below the established threshold providing a data difference size of least value, the data difference size of least value being stored in place of an original file for transmission via the basal port;

base quality and data difference file transmissions being synchronized at the receiving client computer by aligning the base quality and data difference file transmissions on a timestamp via the non-transitory, computer-implementable data transmission application, the non-transitory, computer-implementable data transmission application further (a) applying an algorithmic process to conform the base quality and data difference file transmissions, as aligned on the timestamp, into a series of individual cube face frames and (b) stitching together the cube face frames via a cubic-mapping mechanism for cohesive playback;

video data being transmitted via both the basal port and the at least one secondary port as the individual cube faces for compiling an entire map shape by way of the cubic-mapping mechanism, port quality being dependent upon a visible cube face of the cubic-mapping mechanism as controlled by a viewer at the receiving client computer.

2. The data transmission system of claim 1 wherein audio data is simultaneously transmitted with the video data, the audio data being appended to a select cube face video transmission.

3. The data transmission system of claim 1 wherein audio data is simultaneously transmitted with the video data, the audio data being transmitted in parallel to the video data via a dedicated basal and secondary multi-port set.

4. The data transmission system of claim 1 wherein video data is transmitted to the receiving client computer upon all cube faces at base quality to promote video data load as a viewer changes perspective with additional quality data being added to the visible cube face for enhancing quality of video data consumption thereby.

5. A data transmission system for producing real-time 360-degree video transmissions within a computer-based network environment, the data transmission system comprising:

a sending client computer and a receiving client computer within the computer-based network environment, the sending client computer and the receiving client computer each being outfitted with a non-transitory, computer-implementable data transmission application and at least two data transmission ports, a basal port of the at least two data transmission ports being dedicated for base quality data transmission and at least one secondary port of the at least two data transmission ports being dedicated for data difference file transmission, video data being transmitted via both the basal port and the at least one secondary port aligned on a timestamp and algorithmically processed via the non-transitory, computer-implementable data transmission application as individual cube faces for compiling an entire map shape of a cubic-mapping mechanism, the cubic-mapping mechanism being operable to stitch together the individual cube faces for cohesive playback and producing real-time 360-degree videos, port quality being dependent upon a visible cube face of the cubic-mapping mechanism as controlled by a viewer at the receiving client computer.

6. The data transmission system of claim 5 characterized in that audio data is simultaneously transmitted with the video data, the audio data being appended to a select cube face video transmission.

7. The data transmission system of claim 5 characterized in that audio data is simultaneously transmitted with the video data, the audio data being transmitted in parallel to the video data via a dedicated basal and secondary multi-port set.

8. The data transmission system of claim 5 characterized in that data difference file transmissions are derived from compared data difference sizes, data difference sizes all exceeding an established threshold value denoting a new base file designation for transmission via the at least one secondary port, data difference sizes determined below the established threshold providing a data difference size of least value, the data difference size of least value being stored in place of an original file for transmission via the basal port, base quality and data difference file transmissions being synchronized at the receiving client computer via the non-transitory, computer-implementable data transmission application for producing higher than basal quality output.

9. The data transmission system of claim 5 wherein video data is transmitted to the receiving client computer upon all cube faces at base quality to promote video data load as a viewer changes perspective with additional quality data being added to the visible cube face for enhancing quality of video data consumption thereby.

10. A data transmission system for enhancing quality of 360-degree video data transmissions within a computer-based network environment, the data transmission system comprising:

a sending client computer and a receiving client computer within the computer-based network environment, the sending and receiving client computers each being outfitted with a non-transitory, computer-implementable data transmission application and at least two data transmission ports in communication with a cube-mapping mechanism, a basal port of the at least two data transmission ports being dedicated for base quality transmission and at least one secondary port of the at least two data transmission ports being dedicated for data difference file transmission, video data being transmitted to the receiving client computer via both the basal port and the at least one secondary port aligned on a timestamp and algorithmically processed via the non-transitory, computer-implementable data transmission application as individual cube faces for compiling an entire map shape of the cube-mapping mechanism, the cube-mapping mechanism being operable to stitch together the individual cube faces for cohesive playback and producing 360-degree videos, port quality being dependent upon a visible cube face of the cube-mapping mechanism as controlled by a viewer at the receiving client computer.

11. The data transmission system of claim 10 wherein the 360-degree videos are produced in real-time.

12. The data transmission system of claim 10 wherein the cube-mapping mechanism utilizes six cube faces of a cube for compiling a map shape.

13. The data transmission system of claim 10 wherein the computer-implementable data transmission application provides the cube-mapping mechanism.

14. The data transmission system of claim 10 characterized in that audio data is simultaneously transmitted with the video data, the audio data being appended to a select cube face video transmission.

15. The data transmission system of claim 10 characterized in that audio data is simultaneously transmitted with the video data, the audio data being transmitted in parallel to the video data via a dedicated basal and secondary multi-port set.

16. The data transmission system of claim 10 characterized in that data difference file transmissions are derived from compared data difference sizes, data difference sizes all exceeding an established threshold value denoting a new base file designation for transmission via the at least one secondary port, data difference sizes determined below the established threshold providing a data difference size of least value, the data difference size of least value being stored in place of an original file for transmission via the basal port, base quality and data difference file transmissions being synchronized at the receiving client computer via the non-transitory, computer-implementable data transmission application.

17. The data transmission system of claim 10 wherein video data is transmitted to the receiving client computer upon all cube faces at base quality to promote video data load as a viewer changes perspective with additional quality data being added to the visible cube face for enhancing quality of video data consumption thereby.

* * * * *